United States Patent
Song

(10) Patent No.: US 12,028,187 B2
(45) Date of Patent: Jul. 2, 2024

(54) MACHINE LEARNING-BASED CHANNEL ESTIMATION

(71) Applicant: Nokia Solutions and Networks Oy, Espoo (FI)

(72) Inventor: Nuan Song, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/641,632

(22) PCT Filed: Sep. 19, 2019

(86) PCT No.: PCT/CN2019/106800
§ 371 (c)(1),
(2) Date: Mar. 9, 2022

(87) PCT Pub. No.: WO2021/051362
PCT Pub. Date: Mar. 25, 2021

(65) Prior Publication Data
US 2022/0376957 A1 Nov. 24, 2022

(51) Int. Cl.
*H04L 25/02* (2006.01)
(52) U.S. Cl.
CPC ...... *H04L 25/0254* (2013.01); *H04L 25/0204* (2013.01); *H04L 25/022* (2013.01); *H04L 25/0224* (2013.01)
(58) Field of Classification Search
CPC .............. H04L 25/0204; H04L 25/022; H04L 25/0224; H04L 25/0254
See application file for complete search history.

(56) References Cited

U.S. PATENT DOCUMENTS 8,699,978 B1 4/2014 Nabar et al. ............... 455/179.1
9,219,629 B1 * 12/2015 Sun ..................... H04L 25/0206
(Continued)

FOREIGN PATENT DOCUMENTS

CN 108833313 A 11/2018
CN 109076403 A 12/2018
(Continued)

OTHER PUBLICATIONS

Grais, Emad M., et al., «Deep Neural Networks For Single Channel Source Separation, 2014 IEEE International Conference on Acoustic, Speech and Signal Processing (ICASSP), Jul. 14, 2014, pp. 3734-3738.
(Continued)

*Primary Examiner* — David B Lugo
(74) *Attorney, Agent, or Firm* — Harrington & Smith

(57) ABSTRACT

Example embodiments of the present disclosure relate to machine learning-based channel estimation. According to an example embodiment, a first device determines a signal quality that is expected in transmission of a reference signal from a second device to the first device and receives the reference signal from the second device. The first device selects, based on the expected signal quality, a channel estimation model from a plurality of channel estimation models that have been trained for a plurality of candidate signal qualities for the reference signal. The first device determines, using the selected channel estimation model and based on the received reference signal, channel state information of a communication channel from the first device to the second device. According to this solution, a channel estimation model is dynamically selected for use, depending on a real-time signal quality expected to be gained in transmission of a certain RS.

11 Claims, 11 Drawing Sheets

(56) References Cited

U.S. PATENT DOCUMENTS

| | | | |
|---|---|---|---|
| 2007/0104253 A1* | 5/2007 | Luo | H04L 25/0224 |
| | | | 375/148 |
| 2007/0213087 A1 | 9/2007 | Laroia et al. | 455/522 |
| 2011/0194430 A1* | 8/2011 | Yoo | H04L 25/0224 |
| | | | 370/252 |
| 2014/0254534 A1 | 9/2014 | Zhang | 370/329 |
| 2016/0173306 A1* | 6/2016 | Hong | H04B 17/309 |
| | | | 370/329 |
| 2018/0367192 A1 | 12/2018 | O'Shea et al. | 7/452 |
| 2019/0097694 A1* | 3/2019 | Jeon | H04B 7/0632 |
| 2019/0277957 A1 | 9/2019 | Chandrsekhar et al. | |
| 2021/0045062 A1* | 2/2021 | Ryu | H04L 5/0051 |

FOREIGN PATENT DOCUMENTS

| | | |
|---|---|---|
| CN | 110034792 A | 7/2019 |
| JP | 2019101792 A | 6/2019 |
| WO | WO-2014/040655 A1 | 3/2014 |
| WO | WO 2019/228614 A1 | 12/2019 |

OTHER PUBLICATIONS

Kim, Yonghwi, et al., "Identifying Signal Source using Channel State Information in Wireless LANs", 2018 IEEE International Conference on Information Networking (ICOIN), Apr. 23, 2018, pp. 616-621.

* cited by examiner

400

| CHANNEL ESTIMATION MODEL | CANDIDATE SIGNAL QUALITY (SNR/dB) | SIGNAL QUALITY RANGE (SNR/dB) |
|---|---|---|
| MODEL 203-1 | -10 | $(-\infty, -10)$ |
| MODEL 203-2 | -7.5 | $[-10, -5)$ |
| MODEL 203-3 | -2.5 | $[-5, 0)$ |
| MODEL 203-4 | 2.5 | $[0, 5)$ |
| MODEL 203-5 | 7.5 | $[5, 10)$ |
| MODEL 203-6 | 12.5 | $[10, 15)$ |
| MODEL 203-7 | 15 | $[15, +\infty)$ |

700

| CHANNEL ESTIMATION MODEL | NO. OF BEAMS | CANDIDATE SIGNAL QUALITY (SNR/dB) | SIGNAL QUALITY RANGE (SNR/dB) |
|---|---|---|---|
| MODEL 203-1 | 1 | -10 | $(-\infty, -10)$ |
| MODEL 203-2 | 2 | | |
| MODEL 203-3 | 1 | -7.5 | [-10, -5) |
| MODEL 203-4 | 2 | | |
| MODEL 203-5 | 1 | -2.5 | [-5, 0) |
| MODEL 203-6 | 2 | | |
| MODEL 203-7 | 1 | 2.5 | [0, 5) |
| MODEL 203-8 | 2 | | |
| MODEL 203-9 | 1 | 7.5 | [5, 10) |
| MODEL 203-10 | 2 | | |
| MODEL 203-11 | 1 | 12.5 | [10, 15) |
| MODEL 203-12 | 2 | | |
| MODEL 203-13 | 1 | 15 | $[15, +\infty)$ |
| MODEL 203-14 | 2 | | |

Fig. 7

MACHINE LEARNING-BASED CHANNEL ESTIMATION

CROSS REFERENCE TO RELATED APPLICATION

This patent application is a U.S. National Stage application of International Patent Application Number PCT/CN2019/106800 filed Sep. 19, 2019, which is hereby incorporated by reference in its entirety.

FIELD

Embodiments of the present disclosure generally relate to the field of communication and in particular, to methods, devices, apparatuses, and computer readable storage medium for channel estimation.

BACKGROUND

Channel state information (CSI) is used in communication systems. CSI is typically used for defining properties of a communication channel to describe how a signal propagates from a transmitter to a receiver. CSI represents the combined effect of the channel, for example, scattering, fading, and power decay with distance. CSI makes it possible to adapt transmissions to current channel conditions and can be advantageously utilized, for example, for achieving reliable communication with high data rates. This can be provided e.g. in multi-antenna systems.

At least some parts of CSI may need to be obtained based on an estimate because the channel conditions vary and so instantaneous CSI needs to be estimated on a short-term basis. A common approach for channel estimation is to use so-called reference signals (RSs) or pilot sequences where known signals or sequences are transmitted from a transmitter and estimate the CSI at a receiver based on these RSs. As accurate as possible channel estimation would be useful in various communication applications such as Multiple-Input Multiple-Output (MIMO), beamforming, or other techniques relying on accurate information regarding the communication channel.

SUMMARY

In general, example embodiments of the present disclosure provide a solution for machine learning-based channel estimation.

In a first aspect, there is provided a first device. The first device comprises at least one processor; and at least one memory including computer program code; where the at least one memory and the computer program code are configured to, with the at least one processor, cause the first device to determine a signal quality that is expected in transmission of a reference signal from a second device to the first device; receive the reference signal from the second device; select a channel estimation model from a plurality of channel estimation models based on the expected signal quality, the plurality of channel estimation models having been trained for a plurality of candidate signal qualities for the reference signal; and determine, using the selected channel estimation model and based on the received reference signal, channel state information of a communication channel from the first device to the second device.

In a second aspect, there is provided a second device. The second device comprises at least one processor; and at least one memory including computer program code; where the at least one memory and the computer program code are configured to, with the at least one processor, cause the second device to transmit a null signal to a first device, a received power of the null signal being used for determining a signal quality that is expected in transmission of a reference signal from the second device to the first device; transmit the reference signal to the first device; and receive data transmitted from the first device over a communication channel, channel state information of the communication channel being determined by the first device using one of a plurality of channel estimation models selected based on the expected signal quality, and the plurality of channel estimation models having been trained for a plurality of candidate signal qualities for the reference signal.

In a third aspect, there is provided a method. The method comprises determining, at a first device, a signal quality that is expected in transmission of a reference signal from a second device to the first device; receiving the reference signal from the second device; selecting a channel estimation model from a plurality of channel estimation models based on the expected signal quality, the plurality of channel estimation models having been trained for a plurality of candidate signal qualities for the reference signal; and determining, using the selected channel estimation model and based on the received reference signal, channel state information of a communication channel from the first device to the second device.

In a fourth aspect, there is provided a method. The method comprises transmitting, at a first device, a null signal to a first device, a received power of the null signal being used for determining a signal quality that is expected in transmission of a reference signal from the second device to the first device; transmitting the reference signal to the first device; and receiving data transmitted from the first device over a communication channel, channel state information of the communication channel being determined by the first device using one of a plurality of channel estimation models selected based on the expected signal quality, and the plurality of channel estimation models having been trained for a plurality of candidate signal qualities for the reference signal.

In a fifth aspect, there is provided an apparatus. The apparatus comprises means for determining, at a first device, a signal quality that is expected in transmission of a reference signal from a second device to the first device; means for receiving the reference signal from the second device; means for selecting a channel estimation model from a plurality of channel estimation models based on the expected signal quality, the plurality of channel estimation models having been trained for a plurality of candidate signal qualities for the reference signal; and means for determining, using the selected channel estimation model and based on the received reference signal, channel state information of a communication channel from the first device to the second device.

In a sixth aspect, there is provided an apparatus. The apparatus comprises means for transmitting, at a first device, a null signal to a first device, a received power of the null signal being used for determining a signal quality that is expected in transmission of a reference signal from the second device to the first device; means for transmitting the reference signal to the first device; and means for receiving data transmitted from the first device over a communication channel, channel state information of the communication channel being determined by the first device using one of a plurality of channel estimation models selected based on the expected signal quality, and the plurality of channel estimation models having been trained for a plurality of candidate signal qualities for the reference signal.

In a seventh aspect, there is provided a non-transitory computer readable medium comprising program instructions for causing an apparatus to perform at least the method according to the above second aspect.

In an eighth aspect, there is provided a non-transitory computer readable medium comprising program instructions for causing an apparatus to perform at least the method according to the above third aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 7 illustrates a mapping between the candidate signal qualities, the signal quality ranges, and the number of beams according to some example embodiments of the present disclosure;

Throughout the drawings, the same or similar reference numerals represent the same or similar element.

DETAILED DESCRIPTION

Figure 1A:
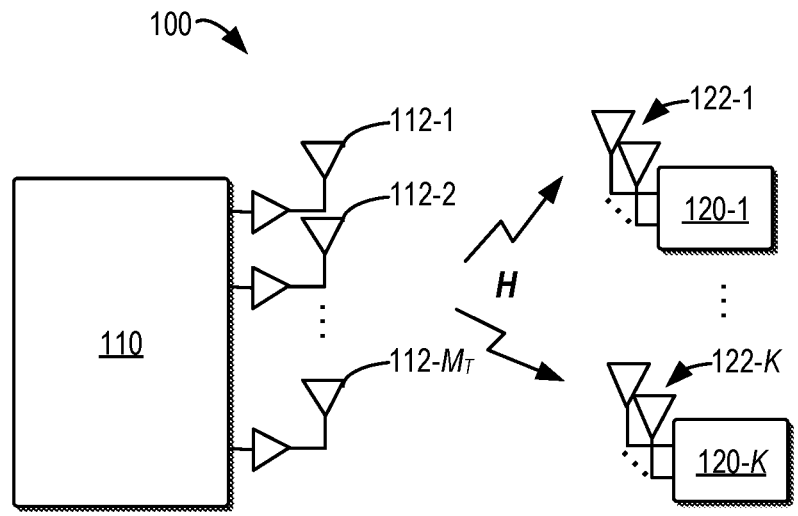
FIG. 1A illustrates an example communication system in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network or system may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network or system via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Example Environment

FIG. 1A illustrates an example communication system 100 in which example embodiments of the present disclosure may be implemented. The system 100 includes a plurality of communication devices, such as a first device 110 and K second devices 120-1, . . . , 120-K (where K is equal to or larger than one). For convenience of discussion, the second devices 120-1, . . . , 120-K may be collectively or individually referred to as second devices 120. In this example, the first device 110 is illustrated as a network device, and the second devices 120 are illustrated as terminal devices.

The first device 110 and second devices 120 typically communicate with one another via antenna arrangements over a communication channel. In the example where the first device 110 is a network device and the second devices 120 are terminal devices, a communication channel from the first device 110 to the second devices 120 is called as a downlink (DL) or a DL channel, while a communication channel from the second devices 120 to the first device 110 is called as an uplink (UL) or an UL channel.

As shown, the first device 110 is equipped with antennas 112-1, 112-2, . . . , 112-$M_T$ (collectively or individually referred to as antennas 112). Each of the second devices 120 is equipped with a set of antennas 122-1, . . . , or 122-K (collectively or individually referred to as an antenna set 122), including one or more antennas. The number of antennas of a second device is represented as $M_{R_k}$, and the total number of antennas of all the K second devices 120 is represented as $M_R = \sum_{k=1}^{K} M_{R_i}$.

The antennas of the first and second devices 110, 120 can transmit and receive data. The communication system 100 is considered as a multi-antenna communication system which can support (1) multiple-input multiple-output (MIMO) transmission from multiple transmit antennas to multiple receive antennas or massive MIMO, (2) multiple-input single-output (MISO) transmission from multiple transmit antennas to a single receive antenna, or (3) single-input single-output (SISO) transmission from a single transmit antenna to a single receive antenna. FIG. 1A shows a multiple user (MU)-MIMO system where the first device 110 communicates with more than one second device 120. FIG. 1A schematically shows a communication channel from the first device 110 to the second device(s) 120, represented as H.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), MIMO, Orthogonal Frequency Division Multiple (OFDM), Discrete Fourier Transform spread OFDM (DFT-s-OFDM) and/or any other technologies currently known or to be developed in the future. In some example embodiments, the first device 110 and the second devices 120 may operate at Millimeter Wave (mmWave) frequencies.

It is to be understood that the numbers of devices and antennas are only for the purpose of illustration without suggesting any limitations. The system 100 may include any suitable number of first and second devices adapted for implementing embodiments of the present disclosure or a first or second device with any suitable number of antennas. For example, the first device may communicate with one second device.

During operation, an estimate and prediction of a communication channel between a transmitter side and a receiver side is normally needed. Channel estimation is typically performed by sending a reference signal from the transmitter and measuring the reference signal at the receiver. The reference signal is made up of a sequence of symbols that are known a priori by both the transmitter and receiver. The receiver can thus estimate the communication channel based on the received symbols and the known symbols.

Accurate channel estimation is required to recover data sent via the communication channel, especially in applications such as MIMO, beamforming, or other techniques relying on accurate information regarding the channel response. For example, analog-digital hybrid beamforming is quite cost effective and can be easily implemented in practical massive MIMO systems. The hybrid beamforming is to split the beamforming split into analog and digital domains in order to avoid solving the complicated optimization problem. However, the hybrid beamforming highly relies on accurate channel estimation to ensure alignment of the transmit and receive beams in the analog beamforming so as to ensure the digital beamforming procedure. In other communication applications other than the hybrid beamforming, the channel estimation is also required for parameter configuration in communication over the corresponding channel.

Figure 1B:
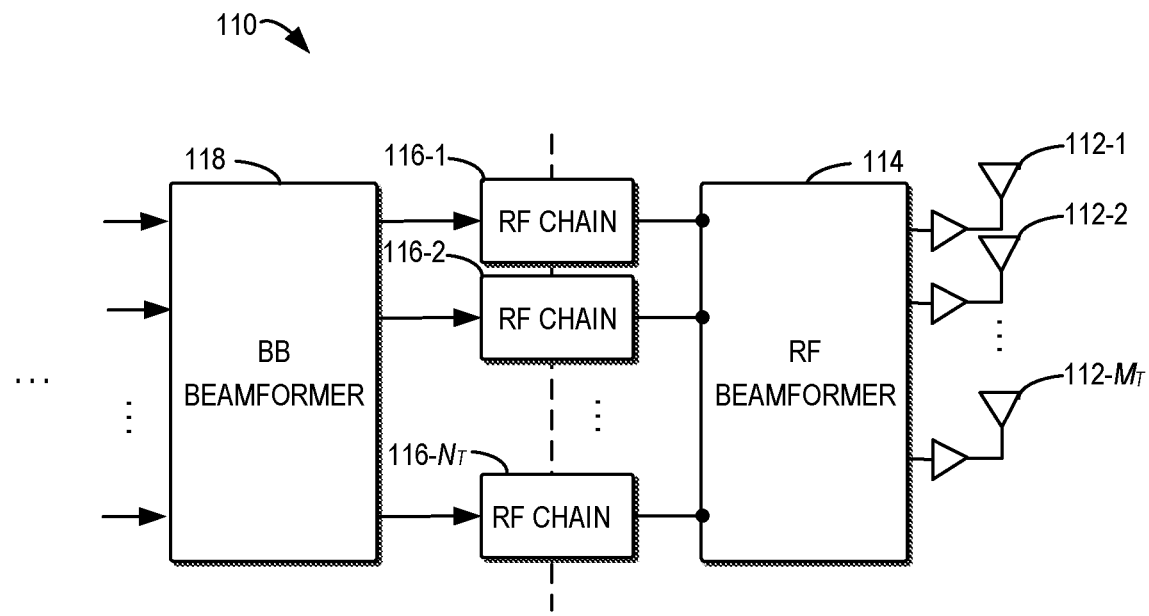
FIG. 1B illustrates an example block diagram of the first device in the communication system of FIG. 1A.

As an example, FIG. 1B shows a block diagram of the first device 110 which implements hybrid beamforming. The first device 110 includes a radio frequency (RF) beamformer 114 to implement analog beamforming in the analog domain and a baseband (BB) beamformer 118 to implement digital beamforming in the digital domain. A plurality of ($N_T$) RF chains 116-1, 116-2, ..., 116-$N_T$ (collectively or individually referred to as RF chains 116) are provided between the RF beamformer 114 and the BB beamformer 118. The RF beamformer 114 is connected to the $M_T$ antennas 112. The RF beamformer 114, RF chains 116, and BB beamformer 118 work together with the antennas 112 to implement the hybrid beamforming.

In transmission from the first device 110 to the second devices 120, upon processing by other components of the first device 110, a plurality of data streams are provided to the BB beamformer 118, processed by the BB beamformer 118, RF chains 116, and RF beamformer 114, and transmitted by the antennas 112 to one or more second devices 120 using one or more transmit beams. In such transmission, channel estimation is required to configure the beamforming.

The overall channel from the first device 110 to the second devices 120 in the system 100 is represented as $H \in C^{M_R \times M_T}$, where $M_R$ is the total number of antennas of all the K second devices 120 communicated with the first device 110, and $M_T$ is the total number of antennas of the first device 110, and $H=[H_1, H_2, \ldots, H_K]$ with $H_k$ represents a communication channel from the k-th second device 120 when considering the overall channel as a widely-used clustered model.

The channel H can be estimated via transmission of a reference signal from the second devices 120 to the first device 110. For example, by considering the channel reciprocity in two directions between the first device 110 and the second devices 120, an overall channel from the second devices 120 to the first device 110 may be determined as a transpose of the overall channel from the first device 110 to the second devices 120, representing as $H_u = H^T$. If the first device 110 performs channel estimation based on transmission of a reference signal and it is assumed that the reference signal transmitted by a k-th second device 120 to the first device 110 is represented as follows:

$$X_k \in \mathcal{R}^{M_{R_k} \times N_{RS}}$$

then the received reference signal (RS) at the first device 110 can be represented as follows:

$$Y = WH_u X + WN, Y \in C^{N_T \times N_{RS}} \quad (1)$$

where Y represents the received RS, X represents a total vector of the RSs transmitted by the K second devices 120 where $X=[X_1^T, X_2^T, \ldots, X_K^T]^T \in C^{M_R \times N_{RS}}$, and the reciprocal channel $H_u$ is defined as $H_u=[H_u^{(1)}, H_u^{(2)}, \ldots, H_u^{(K)}] \in C^{M_T \times M_R}$. Further, in Equation (1), $N_{RS}$ represents a length of the RS (i.e., the number of symbols of the RS), $W \in C^{N_T \times M_T}$ represents a measurement matrix or a received analog beamforming matrix, and $N \in C^{M_T \times N_{RS}}$ represents noise and/or interference occurred in the communication channel. In an example, the noise and/or interface may be, for example, modeled as an Additive White Gaussian Noise (AWGN) and other interference with a zero mean and a power spectral density $N_0$, although other noise and interference models are possible. In an example, the RS transmitted by a k-th second device 120 $X_K$ may be designed to provide orthogonality, containing orthogonal columns satisfying $$X_k X_k^H = \alpha I_{M_{R_k}}, \alpha > 0,$$

where $I_{M_{R_k}}$ is an identity matrix and a represents a transmitted power of the RS.

The channel estimation is to estimate a representation of the channel H or CSI of the channel from the received RS Y. There are still challenges to achieve as accurate as possible channel estimation. For example, in the hybrid beamforming, the number of RF chains is generally smaller than that of the antennas, i.e., $N_T < M_T$, which makes it hard to directly solve H from Y in Equation (1). There have been proposed some compressed Sensing (CS) based techniques can explore the sparsity of the channel, but the optimization problem in CS is usually difficult and has a higher computational complexity and a longer processing time.

Currently, with the development of machine learning techniques, machine learning models have been trained and applied for performing various tasks in different fields. It is found that machine learning-based channel estimation can provide performance enhancement and possibly reduce the computational complexity, overhead, as well as processing latency. Some solutions have been proposed to train a fixed machine learning model for estimation of a communication channel between two devices. Such machine learning may not always be suitable for accurate channel estimation in different communication conditions.

Work Principle and Example Signaling Chart

According to embodiments of the present disclosure, there is providing a solution for machine learning-based channel estimation. In this solution, a first device performs channel estimation for a communication channel from the first device to a second device by applying a machine learning model (referred to as a channel estimation model). A plurality of channel estimation models are trained for a plurality of candidate signal qualities in transmission from the second device to the first device. The first device determines a signal quality expected in transmission of a RS from the second device and selects a channel estimation model from the trained channel estimation models for use based on the expected signal quality. The channel estimation is then performed by receiving the RS from the second device and determining channel state information (CSI) of the communication channel based on the received RS using the selected channel estimation model. According to this solution, a channel estimation model is dynamically selected for use, depending on a real-time signal quality expected to be gained in transmission of a certain RS. Such model selection can be adapted to various RS transmission situations, thereby resulting in more accurate channel estimation.

Figure 2:
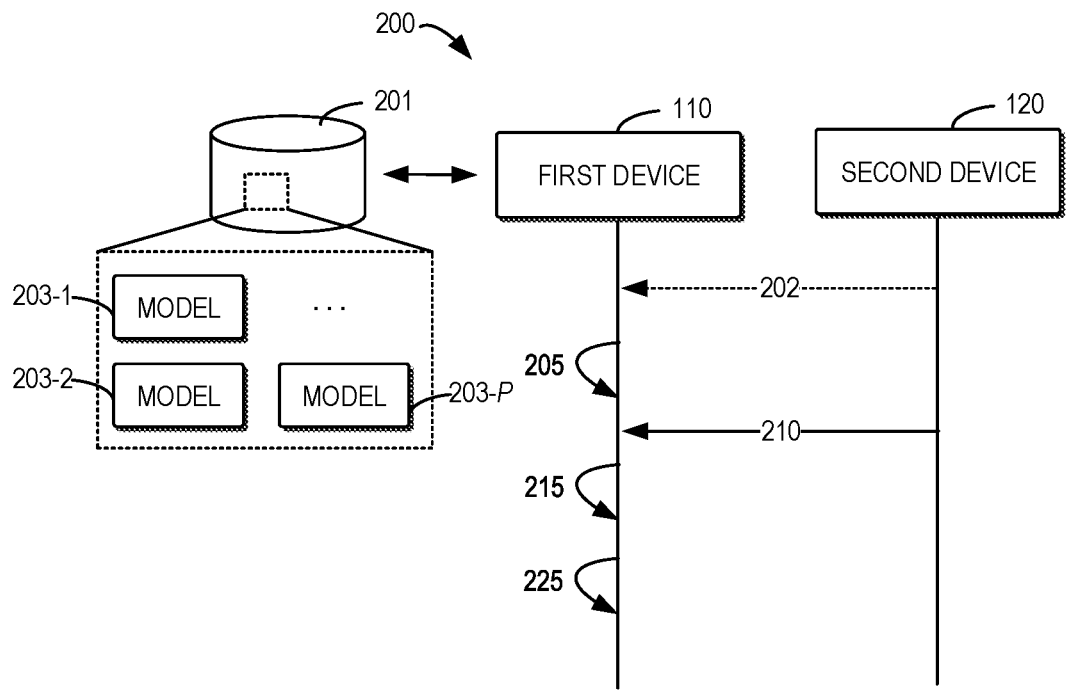
FIG. 2 illustrates a signaling chart illustrating a process for channel estimation according to some example embodiments of the present disclosure.

Principle and embodiments of the present disclosure will be described in detail below with reference to the accompanying drawings. FIG. 2 shows a signaling chart 200 for channel estimation according to an example embodiment of the present disclosure. For the purpose of discussion, the signaling chart 200 will be described with reference to FIG. 1. The signaling chart 200 may involve the first device 110 and one or more second device 120 as illustrated in FIG. 1. It would be appreciated that although FIG. 2 and the following embodiments describe the first device 110, such as a network device, implementing the signaling chart 200, this process may be likewise implemented at a second device 120.

The first device 110 determines 205 a signal quality that is expected in transmission of a RS from a second device 120 to the first device 110. The signal quality of a certain signal generally depends on a transmitted power of the signal and is impacted by noise and/or interference experienced by the signal during the transmission from the second device 120 to the first device 110. In some embodiments, the expected signal quality includes a signal-to-noise ratio (SNR) or a signal-to-interference-plus-noise ratio (SINR) of the RS. Here, the terms "SNR" and "SINR" are used interchangeably. In some embodiments, the expected signal quality is measured specifically as a transmitted SNR of the RS. The determination of the SNR will be in detail below.

As briefly mentioned above, the expected signal quality is used to determine one of a plurality of channel estimation models for use. This is based on a fact found by the inventor that performance of a channel estimation model is signal quality-dependent. Since training of a channel estimation model is data dependent, requiring sufficient training data pairs {H, Y}, where Y is a training received RS that is considered as being received by the first device 110, and H is ground-truth CSI. If a RS is transmitted with different signal qualities (for example, due to different transmitted powers used or a difference noise and/or interferences experienced), the receiver sides obtain different received RS s. Thus, to train a channel estimation model, a signal quality maintained unchanged for all the training received RS s. That is, a channel estimation model is typically trained for a predetermined signal quality. As such, if a channel estimation model is trained for a signal quality of a RS and used to estimate a channel based on reception of a RS transmitted with a different signal quality, the performance may be compromised.

Figure 3:
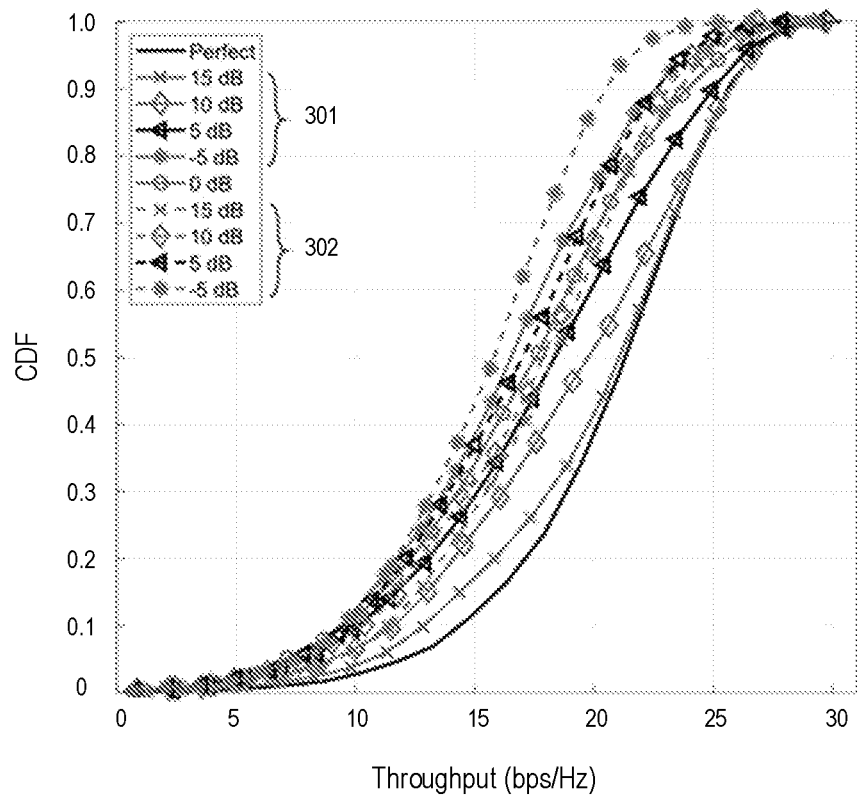
FIG. 3 illustrates schematically comparison of user throughput performances achieved after channel estimation using estimation models trained with matched signal qualities and with mismatched signal qualities.

To better understand the impact on performances due to mismatching of signal qualities in training and in application of the model, reference may be made to FIG. 3. FIG. 3 shows comparison of user throughput performances achieved after channel estimation using estimation models trained with matched signal qualities and with mismatched signal qualities. A cumulative distribution function (CDF) curve in a set of curves 301 indicates the performance achieved after channel estimation using a channel estimation model that is trained for a signal quality and used for channel estimation based on a RS transmitted with a same signal quality (that is, usage of a channel estimation model with matched signal qualities). For example, a channel estimation model is trained for a SNR of 15 dB (a signal quality) and is used to perform channel estimation from reception of a RS transmitted with a same SNR of 15 dB, the performance curve shows that the performance is closer to the perfect performance curve.

A respective CDF curve in a set of curves 302 indicates the performance achieved after channel estimation using a channel estimation model that is trained for a signal quality and used for channel estimation based on a RS transmitted with a different signal quality (that is, usage of a channel estimation model with mismatched signal qualities). The channel estimation model leading to the set of performance curves 302 is trained for a fixed SNR of 0 dB. If this channel estimation model is used to perform channel estimation from reception of a RS transmitted with a SNR of 15 dB, as shown in FIG. 3, the user throughput performance is reduced significantly.

During operation, a signal quality of a RS transmitted from the second device 120 to the first device 110 varies due to various changes occurred in a procedure of transmission from the second device 120 to the first device 110. For example, a transmitted power of the second device 120 changes with the power control. The noise and/or interference may also vary, for example, due to movement of the second devices 120, addition or reduction of one or more second devices 120 that communicate simultaneously with the first device 110. All those changes may lead to a change of the signal quality, such as the SNR.

In some example embodiments, the first device 110 may determine a transmitted SNR of the RS as the expected signal quality. To determine the transmitted SNR, a "null" signal or a "null" reference signal is introduced, to estimate a power of noise and/or interference that is expected to be experienced in transmission of the RS (the valid signal that is received and measured to estimate the channel).

As shown in FIG. 2 as an optional action, the second device 120 transmits 202 a null signal to the first device 110. The first device 110 may instruct when and where the second device 120 is to transmit the null signal and allocates a corresponding time and/or frequency resource(s) for the transmission. The second device 120 transmits the null signal using the allocated resource(s). The first device 110 then detects the null signal at the allocated resource(s). The detected power is considered as a power of noise and/or interference in a communication channel in the direction from the second device 120 to the first device 110. The transmission of the null signal makes it possible for the first device 110 to estimate the noise and/or interference more accurately, for calculating the expected signal quality of the RS (for example, the transmitted SNR of the RS).

The first device 110 determines the transmitted SNR based on the power of noise and/or interference and a transmitted power of the RS, for example, a ratio of the transmitted power of the RS to the power of noise and/or interference. As a specific example, the transmitted SNR of the RS may be calculated as below:

$$pSNR = 10\log_{10}\frac{P_T}{P_0} \quad (2)$$

where $P_T$ represents the transmitted power of the RS, and $P_0$ represents the power of noise and/or interference. Looking back to Equation (1), it can be seen that the expected signal quality of the RS, more specifically, the transmitted SNR of the RS, may impact the received RS Y by the first device 110. In Equation (1), for a certain k-th second device 120, the received RS Y is related to the RS transmitted from the k-th second device 120, $X_k$, and the noise and/or interference N, the expected signal quality of the RS, for example, the transmitted SNR, may be determined, for example, as $$10\log_{10}\frac{\alpha}{N_0}.$$

The transmitted power of the RS may be indicated by the second device 120, for example, through a power headroom report (PHR) transmitted from the second device 120. The PHR indicates how much power the second device 120 is left. The PHR is a measure of difference between the actual transmitted power and the maximum power (for example, per sub-carrier) of the second device 120. The second device 120 can use the PHR to estimate the path loss and calculate the transmitted power of the RS. The transmission of the "null" signal may be aligned with the PHR. In some example embodiments, the second device 120 may transmit the null signal with a transmitted power that is same as a transmitted power to be used to transmit the RS.

In some example embodiments, the expected signal quality may be updated when the first device 110 detects the change of the transmitted power of the RS or receives a new transmission of the null signal.

It would be appreciated that the expected signal quality of the RS can be measured by other metrics, which are generally related to the transmitted power of the RS and the noise and/or interference experienced by the RS. Although an example of calculating the transmitted SNR as an expected signal quality is described above, the transmitted SNR can be determined using various other manners. The scope of the present disclosure is not limited in this regard.

Still referring back to FIG. 2, the first device 110 further receives 210 the RS from the second device 120. The first device 110 may allocate a time and/or frequency resource(s) for the second device 120 to transmit the RS. The RS here is a valid signal used for channel estimation. The RS may be any signal that is known by both the first device 110 and the second device 120 and may include a sequence of symbols. In some example embodiments, the RS is a sounding reference signal (SRS). In other example embodiments, other types of RS are also possible. The first device 110 obtains measurements regarding the received RS.

In some example embodiments, the periods for determining the expected signal quality may be larger than the periods for transmitting the RS. For example, the first device 110 may control the transmission cycles of the null signal and the valid RS such that the transmission cycle of the null signal is larger than that of the RS.

The first device 110 further selects 215, based on the expected signal quality, a channel estimation model from a plurality of channel estimation models 203-1, 203-2, . . . , 203-P that have been trained (collectively or individually referred to as channel estimation models 203 or model 203, where P is larger than or equal to two). A channel estimation model 203 is a machine learning model and is trained to have the capability of determining CSI of a communication channel from a received RS. Thus, the input to the channel estimation model is the received RS while the output is the determined CSI.

Performing machine learning usually involves the following three phases: a training phase to train a machine learning model with a training dataset by pairing an input with an expected output and to determine parameters of the models; an evaluation/test phase to estimate how well the model has been trained by estimating model performance characteristics (e.g., classification errors for classifiers, etc.) using an evaluation dataset and/or a test dataset; and an implementation phase to apply the real-world data to the trained machine learning model to get the results.

In some example embodiments of the present disclosure, the first device 110 performs the implementation phase of the channel estimation models 203, i.e., apply a received RS to the channel estimation models to get the channel estimation result, the CSI. In some example embodiments, the training phase and the evaluation/test phase of the channel estimation models 203 may be performed by the first device 110 or by other computing devices or nodes. In the latter case, the trained channel estimation models 203 may be provided to the first device 110 for use. For example, the detailed model configuration and trained parameters may be stored in storage 201 accessible by the first device 110. The storage 201 may be internal storage or external storage of the first device 110.

A channel estimation model 203 may include at least one of a deep neural network (DNN), a convolutional neural network (CNN), a deep Residual Convolutional Neural Network (ResCNN), a recurrent neural network (RNN), or other machine learning or deep learning models including parametric multiplications, additions, and non-linearities. The channel estimation model 203 may be trained in a supervised manner and the training dataset may include sufficient training data pairs {H, Y}, where Y is a training received RS that is considered as being received by the first device 110, and H is ground-truth CSI. Some example model structure and training phase of the channel estimation models 203 will be described in detail below.

According to example embodiments of the present disclosure, the plurality of channel estimation models 203 have been trained for a plurality of candidate signal qualities in reference signal transmission. More specifically, one channel estimation model 203 has been trained for a specific candidate signal quality, such as a value of the transmitted SNR. This means that the training received RSs for this channel estimation model 203 include those that are generated as being received with the candidate signal quality. Such training received RSs may be received RSs by the first device 110 through actual transmissions with the candidate signal quality, and/or may be simulated signals that are generated as being transmitted with the candidate signal quality. In some example embodiments, two or more channel estimation models 203 may have been trained for a same candidate signal quality, as will be seen from the following description regarding the predetermined beam(s).

Accordingly, each of the plurality of trained channel estimation models 203 is associated with the corresponding candidate signal quality. In some example embodiments, the number of candidate signal qualities may be sampled from a potential signal quality range that can be achieved in communication between the second devices 120 to the first device 110. For example, if it is determined that the potential signal quality range is a SNR range from −10 dB to 15 dB, different candidate signal qualities may be sampled from this range with the same or different intervals.

In some example embodiments, since the candidate signal qualities are some discrete values and the determined expected signal quality may not always exactly match with one of the candidate signal qualities, to select the channel estimation model, the first device 110 may compare the expected signal quality with the respective candidate signal qualities and identified the one that is closest to the expected signal quality. The first device 110 may then select the channel estimation model 203 that is trained for the identified candidate signal quality.

Figure 4:
FIG. 4 illustrates a mapping between the candidate signal qualities and the signal quality ranges according to some example embodiments of the present disclosure.

Alternatively, in some example embodiments, the candidate signal qualities may be mapped to corresponding signal quality ranges, where each of the candidate signal qualities fails into the corresponding signal quality range. The signal quality ranges may not be overlapped with each other. For example, a candidate signal quality of SNR of −7.5 dB is mapped to a signal quality range from −10 dB to −5 dB, and a candidate signal quality of SNR of −2.5 dB is mapped to a signal quality range from −5 dB to 0 dB. The channel estimation models trained for the respective candidate signal qualities may then be associated with the corresponding signal quality ranges. FIG. 4 illustrates a mapping 400 between the candidate signal qualities and the signal quality ranges as well as the association with the channel estimation models 203.

The first device 110 may obtain such mapping and determine one of the plurality of signal quality ranges into which the expected signal quality fails. The first device 110 may then select the channel estimation model that is associated with the determined signal quality range. For example, if the expected signal quality is −3 dB, the first device 110 determines, from the mapping 400, that this signal quality fails into a signal quality range from −5 dB to 0 dB and then selects the channel estimation model 203-3 associated with that signal quality range.

The signal quality ranges may be preset as any ranges or may be determined by considering performances of the channel estimation models 203 in handling channel estimation with respect to the corresponding signal quality ranges. Some example embodiments of determining the signal quality ranges associated with the channel estimation models 203 will be described in detail below.

After selecting the channel estimation model 203, the first device 110 determines, using the selected channel estimation model and based on the received RS, CSI of the communication from the first device 110 to the second device 120 (for example, a DL channel when the first device 110 is a network device while the second device 120 is a terminal device). The determined CSI may define properties of the communication channel, which can represent or model the communication channel. As can be seen from Equation (1), the first device 110 may determine the communication channel H from the received RS $X_k$ if the first device 110 receives the received RS from the k-th second device 110 only.

The data communication from the first device 110 to the second device 120 may be performed based on the determined CSI. In the examples of beamforming-based communication, such as the hybrid beamforming shown in FIG. 1B, the first device 110 may determine a beamforming configuration for transmission from the first device 110 to the second device 120 based on the CSI. For example, the first device 110 may determine one or more configuration parameters of the BB beamformer 118 and/or the RF beamformer 114 based on the beamforming configuration. The first device 110 may then transmit data over the communication channel from the first device 110 to the second device based on the beamforming configuration. It would be appreciated that the CSI may be used to guide or determine other communication parameters over the communication channel and the present disclosure is not limited in this regard.

According to example embodiments of the present disclosure, by dynamically selecting the appropriate channel estimation model based on the real-time expected signal quality, it can improve the channel estimation and can further improve the performance of data transmission based on the estimated CSI.

Figure 5A:
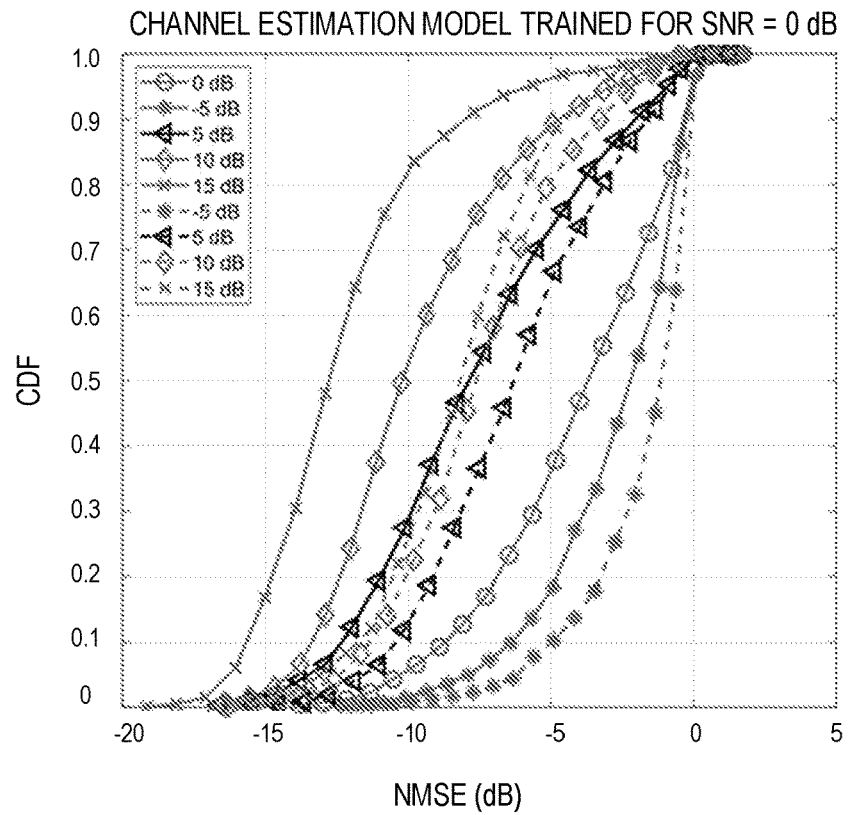
FIGS. 5A-5B illustrate example performance of channel estimation for different expected signal qualities using channel estimation models.
Figure 5B:
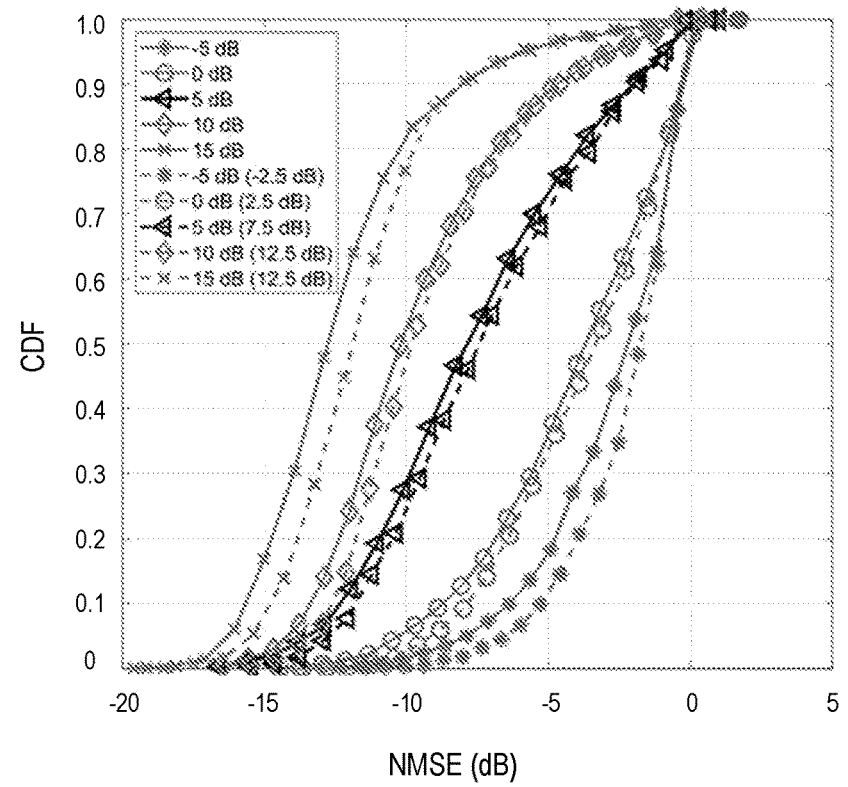

FIG. 5A shows performance of channel estimation for different expected signal qualities using a channel estimation model trained for a fixed signal quality, and FIG. 5B shows performance of channel estimation for different expected signal qualities using a channel estimation model trained for matched signal qualities. In the examples of FIG. 5A and FIG. 5B, the signal qualities are measured by transmitted SNR, and the channel estimation model used in the example of FIG. 5A is trained for a transmitted SNR of 0 dB. The performance is measured by a Normalized Mean Square Error (NMSE).

As can be observed in FIG. 5A, the channel estimation model trained for SNR=0 dB cannot estimate CSI well in cases of SNR gap greater than 5 dB. The NMSE performance increases with an increasing SNR gap. Using the proposed dynamic model selection based on the expected signal quality, it can be seen from FIG. 5B that the CSI estimation performance is greatly improved.

It would be appreciated that while actions are depicted in a particular order, this should not be understood as requiring that such operations be performed in the particular order shown or in sequential order, or that all illustrated actions be performed, to achieve desirable results. For example, the action of selecting a channel estimation model may be performed before or in parallel with the action of receiving the RS. As another example, the action of receiving the RS may even be performed before the action of determining the expected signal quality.

Example Embodiments of RS Reception Using Predetermined Beam(s)

In some example embodiments, to obtain more measurements of the RS, the first device 110 may instruct the second device 120 to transmit the RS for two or more times in some cases. If a single RS transmission is performed, the CSI H needs to be recovered from the observation of a dimension $N_T$, as can be seen from Equation (2). In some cases, for example, at a lower signal quality of the RS, the observation of a dimension $N_T$ may not be enough to provide an accurate estimate. To increase the number of RS transmissions, sufficient observation can be obtained. For example, if two RS transmissions are determined, the observation has a higher degree of freedom and thus a better estimation performance can be achieved.

In some example embodiments, the first device 110 determines a first number of transmissions of the RS, the first number may be equal to or larger than one. The first number may be determined based on various factors. For example, if the first device 110 detects that the expected signal quality is relatively lower, which means that the RS might experience a high level of noise and interference, the first device 110 may determine the first number to be larger than one. Alternatively, or in addition, the first number may also be determined by the first device 110 based on the available resources for the repetitive transmissions, and/or any other factors. In some example embodiments, the first number may be one or two as it is found that from the perspective of the overhead perspective and simulations, two transmissions of RS may be enough for the machine learning-based CSI estimation. It would be appreciated that the first number may also be determined as being larger than two.

The first device 110 transmits an indication of the first number to the second device 120. The second device 120, upon reception of the first number, may repeatedly transmit the RS for the first number of times, and the first device 110 may receive the first number of transmissions of the RS. The first device 110 may allocate corresponding resources for the second device 120 to transmit the RS for the first number of times.

In some example embodiments, the reception(s) of the RS may be performed using a corresponding number of beams (a second number of beams, where the second number is equal to the first number). If the second number is larger than one, the first device 110 may use more than one different beam to receive the transmissions of the RS.

Figure 6A:
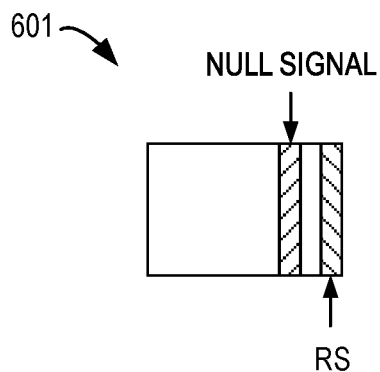
FIG. 6A illustrates an example frame for signal transmission according to some example embodiments of the present disclosure.
Figure 6B:
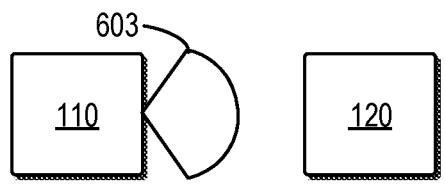
FIG. 6B illustrates an example signal reception of the first device according to some example embodiments of the present disclosure.
Figure 6C:
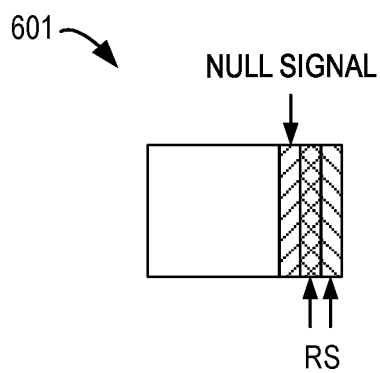
FIG. 6C illustrates an example frame for signal transmission according to some other example embodiments of the present disclosure.
Figure 6D:
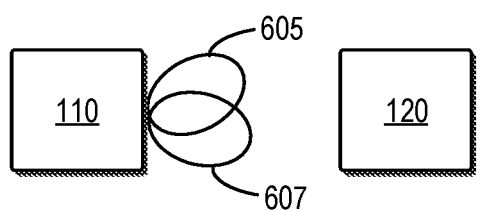
FIG. 6D illustrates an example signal reception of the first device according to some other example embodiments of the present disclosure.

As shown in FIG. 6A, in a frame 601 available for transmission from the second device 120 to the first device 110, a resource is allocated for transmission of the null signal and a resource is allocated for one transmission of the RS. The first device 110 then receives one transmission of the RS using a beam 603, as shown in FIG. 6B. In the example of FIG. 6C, in the frame 601, resources are allocated for two transmissions of the RS. The first device 110 then receives two transmissions of the RS using two different beams 605 and 607, respectively, as shown in FIG. 6D.

Upon reception of two or more repetitive transmissions of the RS from the second device 120, the first device 110 may combine the received RSs as input to the selected channel estimation model 203 203 for determining the CSI.

To estimate the CSI from the received RS, it is also important to select the measurement matrix W. The measurement matrix W is controlled by the reception configuration of the first device 110 for the RS, which may, for example, be determined by the RF beamformer via the analog phase shifters. This measurement matrix W may be aligned for both the training phase and the implementation phase of the channel estimation models 203. To ensure the alignment, in some example embodiments, the beams used for the reception the RSs are the same in both the training phase and the implementation phase.

More specifically, the number of beam(s) and the exact configurations of the beam(s) for receiving the RS are the same in both the training and implementation phases. That is, a static and predetermined beam(s) is applied. For example, if it is determined to use one beam for training a channel estimation model 203, the same beam is used when the first device 110 selects this channel estimation model 203 for estimating the communication channel. Similarly, if it is determined to use two beams for training a channel estimation model 203, the same two beams are used when the first device 110 selects this channel estimation model 203 for estimating the communication channel. It is noted that in the training phase, it does not necessarily require the first device 110 to actually receive the RS using the corresponding beams(s), but the training received RS can be generated by simulating the reception by the first device 110 using the corresponding beam(s).

As the first device 110 may decide the first number of transmissions of the RS dynamically and thus the second number of beams may be varied, in some example embodiments, each of some or all of the plurality of the channel estimation models 203 may be trained with a set of training received reference signals generated based on a specific number of predetermined beams. That is, a channel estimation model 203 is trained for a specific candidate signal quality of the RS and a set of predetermined beams for receiving the RS. As such, for a same candidate signal quality, two or more channel estimation models 203 may be trained for different numbers of predetermined beams. It would be appreciated that for some candidate signal qualities, there may be only one channel estimation model 203 in some examples.

To facilitate the selection of the channel estimation model by the first device 110, the mapping 400 between the candidate signal qualities and the signal quality ranges as well as the association with the channel estimation models may be redesigned to indicate the association between the channel estimation models 203 and the number of the beams. FIG. 7 shows a mapping 700 which adds the association between the channel estimation models 203 and the number of the beams. The first device 110 may determine the signal quality range to which the expected signal quality fails and the second number of beams to be used for receiving the RS. The first device 110 then selects a channel estimation model 203 that is associated with the corresponding quality range and the second number from the mapping 700.

In some example embodiments, in addition to using the fixed beam(s) in both the training and implementation phases to enable the alignment of the measurement matrix W, to largely maintain the channel properties and ensure the effective array gain, the measurement matrix W can be designed based on the concept of Discrete Prolate Spheroidal Sequences (DPSS) beamspace beamformer. Since the first device 110 may not know the angle(s) of arrivals from the second device 120 or multiple second devices 120, a large angle range may be divided into $N_T$ intervals, where $N_T$ is the number of RF chains or ports at the first device 110. The first device 110 may apply DPSS beamspace beamforming within each angle interval. The semi-definite matrix for the DPSS method for the n-th angle interval with n=1, ..., $N_T$ may be defined as:

$$J_n = \int_{\Theta_n} \int_{\Phi_n} a(\vartheta,\varphi) a^H(\vartheta,\varphi) d\vartheta d\varphi, \quad (3)$$

where $\Theta_n$ and $\Theta_n$ represent the angular regions of interest in two dimensions and $a(\vartheta,\varphi)$ represents the array response at the sampling point $(\vartheta,\varphi)$. By applying the Eigen Value Decomposition (EVD) on $J_n = U_n \Sigma_n U_n^H$, the original DPSS beamspace matrix $\overline{W}_n$ may be determined by summing up (for example, equally combining) the eigenvectors that span the sampled region of interest, as follows:

$$\overline{W}_n = \sum_{m=1}^{M_T} U_n(:,m). \quad (4)$$

The measurement matrix W, for example, the one implemented by analog phase shifters, can be obtained by taking the phases of $\overline{W}_n$, i.e., $$W_n = e^{j \cdot angle(\overline{W}_n)}.$$

The measurement matrix for the predetermined beam can be written as $W = [W_1, W_2, \ldots, W_{N_t}]$. Since this beamforming matrix for the measurement only depends on the array response, it is considered as "static" and is required to be fixed during the training and the implementation phases.

Example Embodiments of Determining Signal Quality Ranges

As mentioned above, the candidate signal qualities used for training the channel estimation models 203 may be mapped to corresponding signal quality ranges to facilitate model selection. In some example embodiments, the signal quality ranges may be determined based on performances of the channel estimation model 203 with respect to the signal quality ranges, so as to guarantee that performance metrics of the plurality of channel estimation models 203 in determining CSI with respect to their associated signal quality ranges exceed a performance threshold.

The determination of the signal quality ranges may be performed in an evaluation phase of the channel estimation models 203, where the performance metrics of the channel estimation models 203 are determined. This evaluation phase may be performed by the device that trains the models 203, by the first device 110, or by any other computing device. In the evaluation phase, the input to a channel estimation model 203 includes test received RSs which are generated based on a plurality of test signal qualities, and the output CSI of the channel estimation model 203 may be compared with ground-truth CSI to determine the performance of this model.

Figure 8:
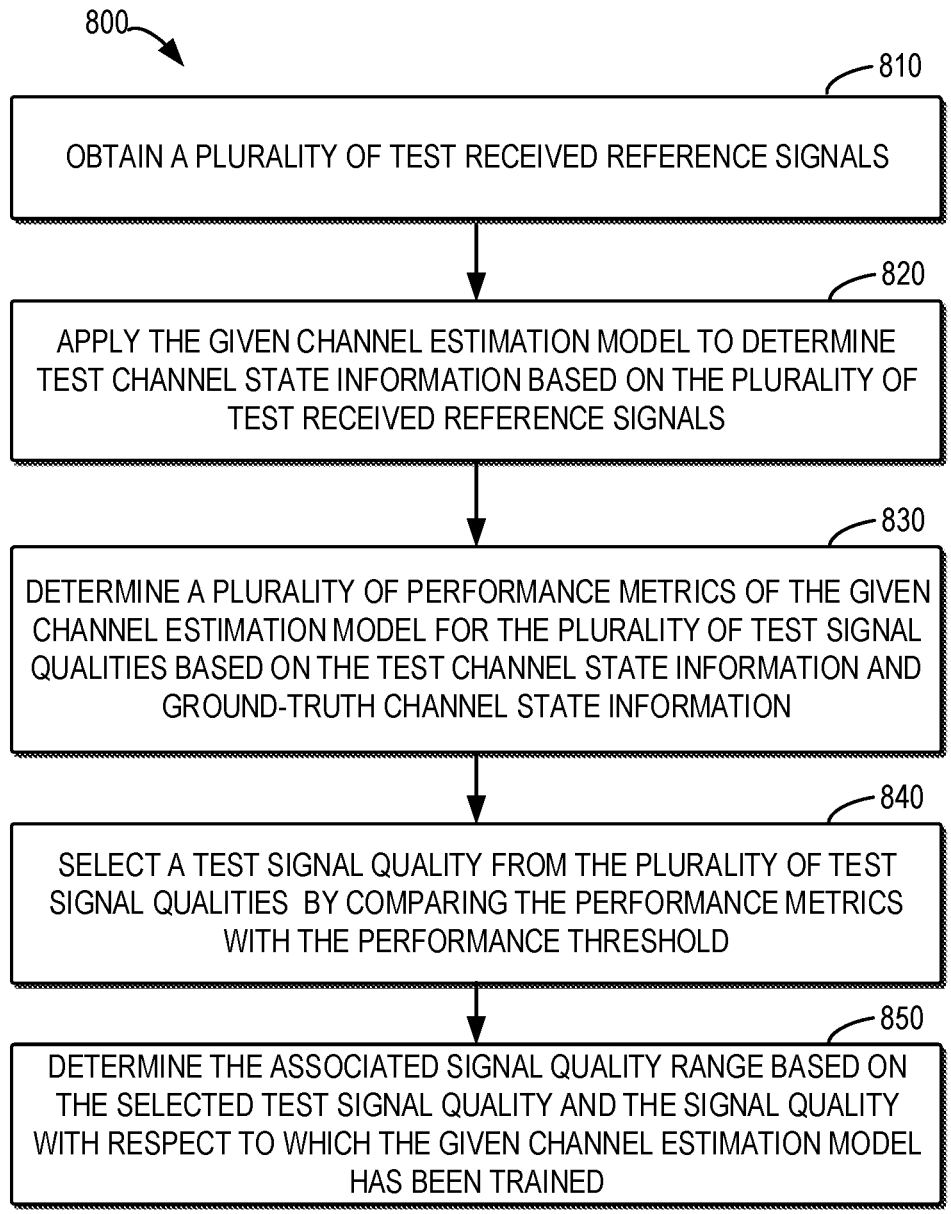
FIG. 8 illustrates a flowchart of a process for determining a signal quality range for a given channel estimation model according to some example embodiments of the present disclosure.

FIG. 8 shows a flowchart of a process 800 for determining a signal quality range for a given channel estimation model 203. This process 800 may be implemented by the device that trains the models 203, by the first device 110, or by any other computing device.

At block 810, a plurality of test received RSs are obtained. The test received RSs are generated based on a plurality of test signal qualities which are sampled from a signal quality range, such as a same range from which the candidate signal qualities are sampled. The intervals of test signal qualities may be the same or different from the candidate signal qualities. The number of the test signal qualities may be any predetermined number. The test received RSs may be generated in a same way as the generation of the training received RS, for example, by simulating the reception of the RS at the side of the first device 110.

At block 820, the given channel estimation model 203 is applied to determine test CSI based on the plurality of test received RSs. For each of the plurality of test received RSs, corresponding test CSI can be obtained. At block 830, a plurality of performance metrics of the given channel estimation model 203 for the plurality of test signal qualities are determined based on the test CSI and ground-truth CSI. A performance metric may be determined by comparing the test CSI for a specific test received RS and the ground-truth CSI. In some example embodiments, the performance metric may be determined as NMSE.

At block 840, from the plurality of test signal qualities, a test signal quality is selected by comparing the performance metrics with the performance threshold. In an example embodiment, the test signal quality that results in a tolerable performance can be selected. For example, the maximum test signal quality that results in a tolerable NMSE (a NMSE smaller than a threshold) may be selected.

At block 850, the associated signal quality range is selected based on the selected test signal quality and the candidate signal quality for which the given channel estimation model 203 has been trained. For example, a tolerant signal quality gap may be determined based on a difference between the selected test signal quality and the candidate signal quality, within which the performance of the given channel estimation model 203 may not vary. The signal quality range may be determined based on the determined tolerant signal quality gap.

Example Model Structure and Model Training

Figure 9:
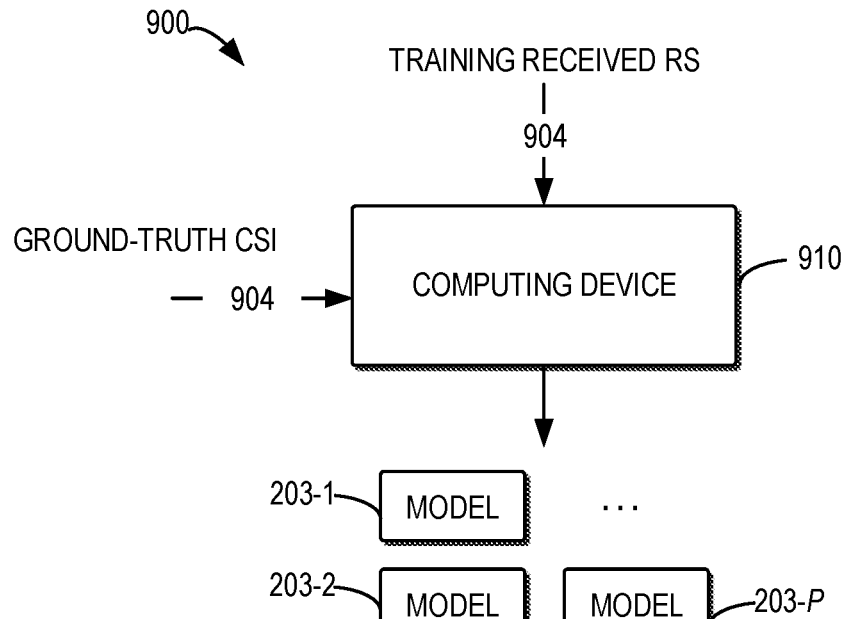
FIG. 9 illustrates a block diagram of example architecture 900 for training the channel estimation model according to some example embodiments of the present disclosure.

As mentioned above, the training phase of the channel estimation model 110 may be implemented at the first device 110 or any other computing device. FIG. 9 shows a block diagram of example architecture 900 for training the channel estimation model 110 according to some example embodiments of the present disclosure. As shown, a computing device 910 performs the training for one or more of the plurality of channel estimation models 203. The training dataset input to the computing device 910 includes training received RSs 902 generated based on respective candidate signal qualities and/or the respective numbers of the beams for receiving the RS. Thus, to train different channel estimation models 203, the used training received RSs may be different. The training data may further include ground-truth CSI 904. The computing device 910 may apply any model training algorithm, either currently know or to be developed in the future, to train the channel estimation models 203.

In some example embodiments, the channel matrix $H_u$ (where $H_u = H^T$) may be split into the real/imaginary parts, i.e., $Re\{H_u\}$ and $Im\{H_u\}$. The two parts may be concatenated along the third dimension. The resulting structured channel is represented by the tensor notation as $\mathcal{H}_u \in \mathbb{R}^{M_T \times M_R \times 2}$.

The channel estimation models 203 may be any type of machine learning models. The CNN may be able to fast explore key features such as channel correlations among antennas, which are advantageous over the fully-connected layer based neural network. The residual network, which learns the identity function easily, helps to train a deeper neural network. It does not influence the whole network but can even improve the performance.

Figure 10:
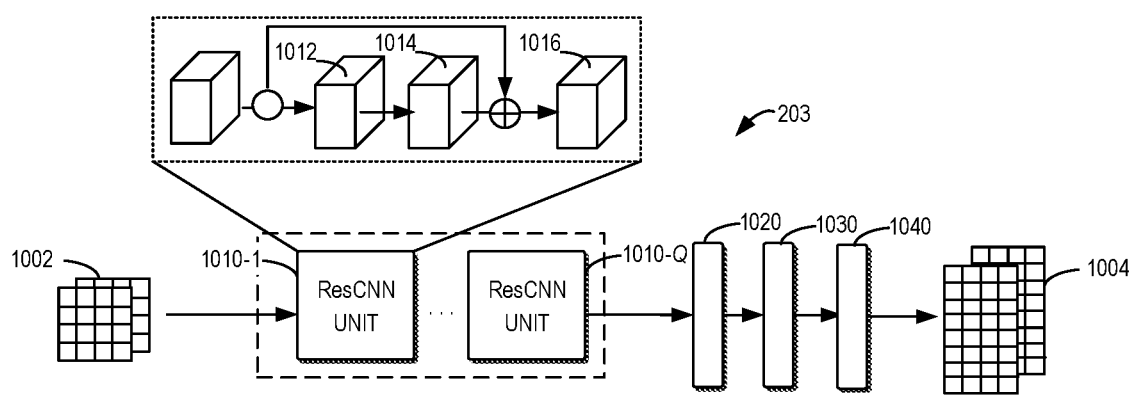
FIG. 10 illustrates a block diagram of an example structure of a channel estimation model according to some example embodiments of the present disclosure.

An example structure of a channel estimation model 203 based on the ResCNN architecture is shown in FIG. 10. The input 1002 is the received RS with the similar formulation as the structured channel, which can be represented as $y \in \mathbb{R}^{N_T \times N_{RS} \times 2}$. There are several (Q) ResCNN units 1010-1, . . . , 1010-Q, including a convolutional layer 1012, followed by a batch-normalization layer 1014, and a non-linear Rectify Linear Unit (ReLU) layer 1016. A shortcut connection considered as the identity mapping is added to skip the convolutional layer 1012 and the batch normalization layer 1014. Each convolutional layer 1012 applies filters of a predetermined size, such as a size of $3 \times 3 \times L_f$, to extract features of the channel from low-rank measurements. A fully-connected layer 1020 is placed after all the ResCNN units 1010-1, . . . , 1010-Q, and another fully-connected layer 1030 may be used to carry out before the output regression layer 1040. The output regression layer 1040 provides the estimated channel H, the transpose of which is equal to $H_u$. The loss function may be determined based on the Mean Squared Error (MSE) of the channel estimation.

It would be appreciated that FIG. 10 merely provides a specific example structure of a channel estimation model. The model structure may be varied and various other types of models may also be applied in example embodiments of the present disclosure. The scope of the present disclosure is not limited in this regard.

Example Processes

Figure 11:
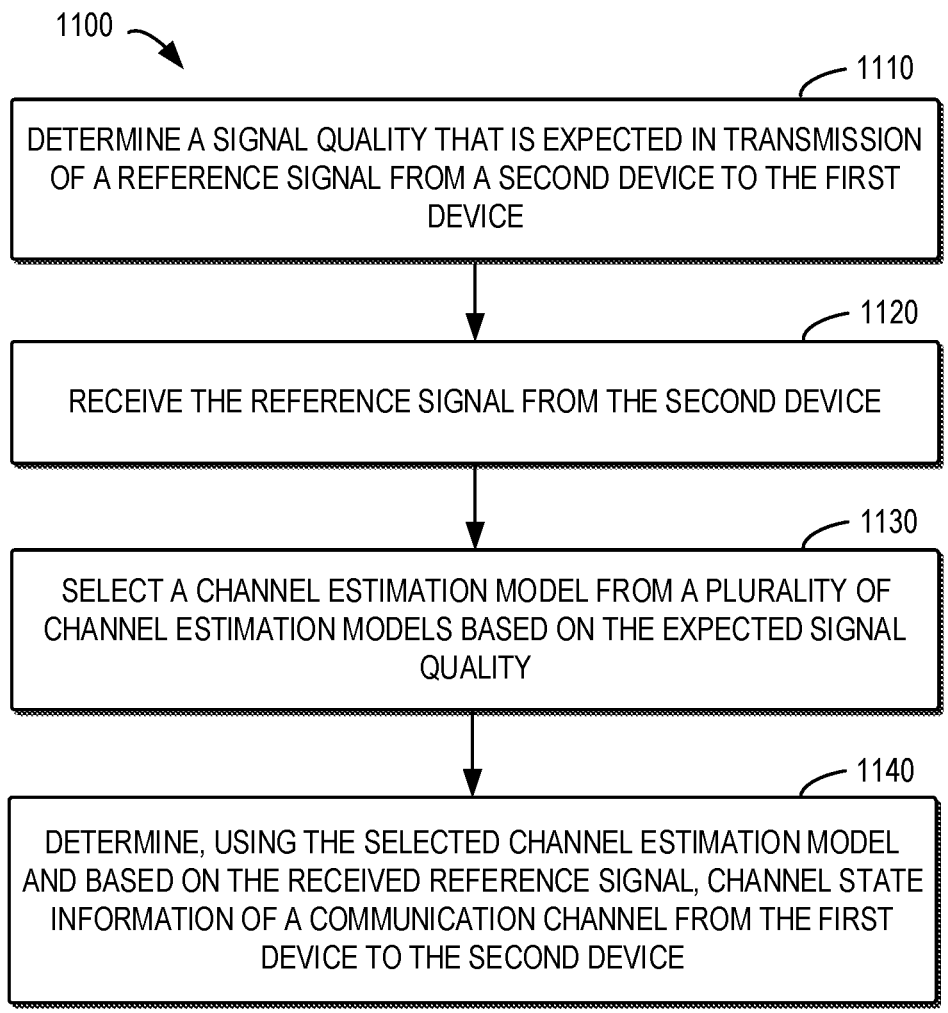
FIG. 11 illustrates a flowchart of a method implemented at a first device according to some example embodiments of the present disclosure.

FIG. 11 shows a flowchart of an example method 1100 implemented at a first device in accordance with some example embodiments of the present disclosure. For the purpose of discussion, the method 1100 will be described from the perspective of the first device 110 with reference to FIG. 1A.

At block 1110, the first device 110 determines a signal quality that is expected in transmission of a reference signal from a second device to the first device. At block 1120, the first device 110 receives the reference signal from the second device. At block 1130, the first device 110 selects a channel estimation model from a plurality of channel estimation models based on the expected signal quality. The plurality of channel estimation models have been trained for a plurality of candidate signal qualities for the reference signal. At block 1140, the first device 110 determines, using the selected channel estimation model and based on the received reference signal, channel state information of a communication channel from the first device to the second device.

In some example embodiments, determining the expected signal quality comprises receiving a null signal from the second device; determining a power of noise and/or interference in the transmission based on a received power of the null signal; and determining the expected signal quality based on the power of noise and/or interference and a transmitted power of the reference signal, the transmitted power of the reference signal being indicated by the second device.

In some example embodiments, determining the expected signal quality comprises determining a transmitted signal-to-noise ratio of the reference signal based on a ratio of the transmitted power of the reference signal to the power of noise and/or interference.

In some example embodiments, receiving the reference signal comprises determining a first number of transmissions of the reference signal, the first number being equal to or larger than one; transmitting an indication of the first number to the second device; and receiving the first number of transmissions of the reference signal from the second device.

In some example embodiments, receiving the first number of transmissions of the reference signal comprises receiving the first number of transmissions of the reference signal with a second number of predetermined beams of the first device, respectively, the second number being equal to the first number.

In some example embodiments, selecting the channel estimation model comprises selecting, from the plurality of channel estimation models, the channel estimation model that has been trained with a set of training received reference signals generated based on the second number of predetermined beams.

In some example embodiments, at least two of the plurality of channel estimation models have been trained with at least two different sets of training received reference signals that are generated based on a same one of the plurality of candidate signal qualities and different numbers of predetermined beams of the first device.

In some example embodiments, the second number of predetermined beams comprises one or two predetermined beams of the first device.

In some example embodiments, selecting the channel estimation model comprises obtaining a mapping between the plurality of candidate signal qualities and a plurality of signal quality ranges associated with the plurality of channel estimation models, performance metrics of the plurality of channel estimation models in determining channel state information with respect to the plurality of signal quality ranges satisfying a performance threshold; determining, based on the mapping, one of the plurality of signal quality ranges into which the expected signal quality falls; and selecting the channel estimation model that is associated with the determined signal quality range.

In some example embodiments, for a given channel estimation model of the plurality of channel estimation models, the associated signal quality range is determined by: obtaining a plurality of test received reference signals, the plurality of test received reference signals generated based on a plurality of test signal qualities; applying the given channel estimation model to determine test channel state information based on the plurality of test received reference signals; determining a plurality of performance metrics of the given channel estimation model for the plurality of test signal qualities based on the test channel state information and ground-truth channel state information; selecting a test signal quality from the plurality of test signal qualities by comparing the performance metrics with the performance threshold; and determining the associated signal quality range based on the selected test signal quality and the candidate signal quality for which the given channel estimation model has been trained.

In some example embodiments, the method further comprises determining a beamforming configuration for transmission from the first device to the second device based on the channel estimation information; and transmitting data over the communication channel from the first device to the second device based on the beamforming configuration.

In some example embodiments, the communication channel is a multiple-input multiple-output communication channel; and/or a first number of radio frequency chains is lower than a second number of antenna ports in the first device.

In some example embodiments, the reference signal is a sounding reference signal; and/or the first device is a network device, and the second device is a terminal device.

Figure 12:
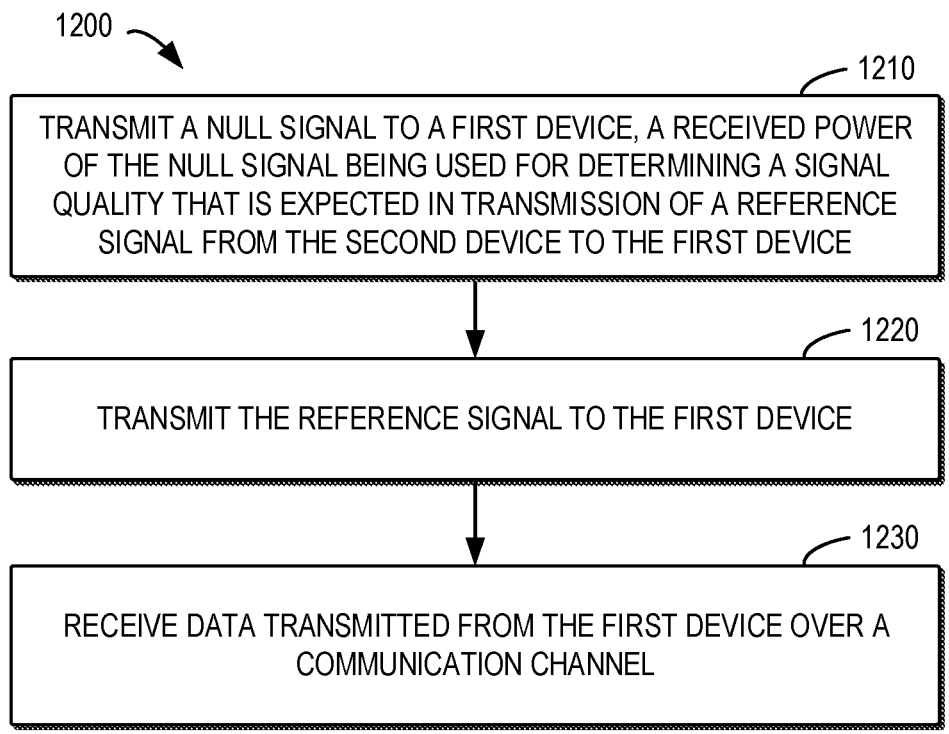
FIG. 12 illustrates a flowchart of a method implemented at a second device according to some example embodiments of the present disclosure.

FIG. 12 shows a flowchart of an example method 1200 implemented at a second device in accordance with some example embodiments of the present disclosure. For the purpose of discussion, the method 1200 will be described from the perspective of the second device 120 with reference to FIG. 1.

At block 1210, the second device 120 transmits a null signal to a first device. A received power of the null signal is used for determining a signal quality that is expected in transmission of a reference signal from the second device to the first device. At block 1220, the second device 120 transmits the reference signal to the first device. At block 1230, the second device 120 receives data transmitted from the first device over a communication channel. Channel state information of the communication channel is determined by the first device using one of a plurality of channel estimation models selected based on the expected signal quality, and the plurality of channel estimation models having been trained for a plurality of candidate signal qualities for the reference signal.

In some example embodiments, the method further comprises indicating a transmitted power of the reference signal to the first device, the expected signal quality being at least based on the transmitted power of the reference signal.

In some example embodiments, transmitting the reference signal comprises receiving, from the first device, an indication of a first number of transmissions of the reference signal, the first number being equal to or larger than one; and performing the first number of transmissions of the reference signal to the first device.

In some example embodiments, the selected channel estimation model has been trained with a set of training received reference signals generated based on a second number of predetermined beams of the first device, and the first number is equal to the second number.

In some example embodiments, the communication channel is a multiple-input multiple-output communication channel; and/or a first number of radio frequency chains is lower than a second number of antenna ports in the first device.

In some example embodiments, the reference signal is a sounding reference signal; and/or the first device is a network device, and the second device is a terminal device.

Example Apparatuses and Device

In some example embodiments, an apparatus capable of performing any of the method 1100 (for example, the first device 110) may comprise means for performing the respective steps of the method 1100. The means may be implemented in any suitable form. For example, the means may be implemented in a circuitry or software module.

In some example embodiments, the apparatus comprises means for determining, at a first device, a signal quality that is expected in transmission of a reference signal from a second device to the first device; means for receiving the reference signal from the second device; means for selecting a channel estimation model from a plurality of channel estimation models based on the expected signal quality, the plurality of channel estimation models having been trained for a plurality of candidate signal qualities for the reference signal; and means for determining, using the selected channel estimation model and based on the received reference signal, channel state information of a communication channel from the first device to the second device.

In some example embodiments means for, determining the expected signal quality comprises means for receiving a null signal from the second device; means for determining a power of noise and/or interference in the transmission based on a received power of the null signal; and means for determining the expected signal quality based on the power of noise and/or interference and a transmitted power of the reference signal, the transmitted power of the reference signal being indicated by the second device.

In some example embodiments, means for determining the expected signal quality comprises means for determining a transmitted signal-to-noise ratio of the reference signal based on a ratio of the transmitted power of the reference signal to the power of noise and/or interference.

In some example embodiments, means for receiving the reference signal comprises means for determining a first number of transmissions of the reference signal, the first number being equal to or larger than one; means for transmitting an indication of the first number to the second device; and means for receiving the first number of transmissions of the reference signal from the second device.

In some example embodiments, means for receiving the first number of transmissions of the reference signal comprises means for receiving the first number of transmissions of the reference signal with a second number of predetermined beams of the first device, respectively, the second number being equal to the first number.

In some example embodiments, means for selecting the channel estimation model comprises selecting, from the plurality of channel estimation models, the channel estimation model that has been trained with a set of training received reference signals generated based on the second number of predetermined beams.

In some example embodiments, at least two of the plurality of channel estimation models have been trained with at least two different sets of training received reference signals that are generated based on a same one of the plurality of candidate signal qualities and different numbers of predetermined beams of the first device.

In some example embodiments, the second number of predetermined beams comprises one or two predetermined beams of the first device.

In some example embodiments, means for selecting the channel estimation model comprises means for obtaining a mapping between the plurality of candidate signal qualities and a plurality of signal quality ranges associated with the plurality of channel estimation models, performance metrics of the plurality of channel estimation models in determining channel state information with respect to the plurality of signal quality ranges satisfying a performance threshold; means for determining, based on the mapping, one of the plurality of signal quality ranges into which the expected signal quality falls; and means for selecting the channel estimation model that is associated with the determined signal quality range.

In some example embodiments, for a given channel estimation model of the plurality of channel estimation models, the associated signal quality range is determined by: obtaining a plurality of test received reference signals, the plurality of test received reference signals generated based on a plurality of test signal qualities; applying the given channel estimation model to determine test channel state information based on the plurality of test received reference signals; determining a plurality of performance metrics of the given channel estimation model for the plurality of test signal qualities based on the test channel state information and ground-truth channel state information; selecting a test signal quality from the plurality of test signal qualities by comparing the performance metrics with the performance threshold; and determining the associated signal quality range based on the selected test signal quality and the candidate signal quality for which the given channel estimation model has been trained.

In some example embodiments, the apparatus further comprises means for determine a beamforming configuration for transmission from the first device to the second device based on the channel estimation information; and means for transmitting data over the communication channel from the first device to the second device based on the beamforming configuration.

In some example embodiments, the communication channel is a multiple-input multiple-output communication channel; and/or a first number of radio frequency chains is lower than a second number of antenna ports in the first device.

In some example embodiments, the reference signal is a sounding reference signal; and/or the first device is a network device, and the second device is a terminal device.

In some example embodiments, the apparatus further comprises means for performing other steps in some example embodiments of the method 1100. In some example embodiments, the means comprises at least one processor; and at least one memory including computer program code, the at least one memory and computer program code configured to, with the at least one processor, cause the performance of the apparatus.

In some example embodiments, an apparatus capable of performing any of the method 1200 (for example, the second device 120) may comprise means for performing the respective steps of the method 1200. The means may be implemented in any suitable form. For example, the means may be implemented in a circuitry or software module.

In some example embodiments, the apparatus comprises means for transmitting, at a first device, a null signal to a first device, a received power of the null signal being used for determining a signal quality that is expected in transmission of a reference signal from the second device to the first device; means for transmitting the reference signal to the first device; and means for receiving data transmitted from the first device over a communication channel, channel state information of the communication channel being determined by the first device using one of a plurality of channel estimation models selected based on the expected signal quality, and the plurality of channel estimation models having been trained for a plurality of candidate signal qualities for the reference signal.

In some example embodiments, the apparatus further comprises indicating a transmitted power of the reference signal to the first device, the expected signal quality being at least based on the transmitted power of the reference signal.

In some example embodiments, means for transmitting the reference signal comprises means for receiving, from the first device, an indication of a first number of transmissions of the reference signal, the first number being equal to or larger than one; and means for performing the first number of transmissions of the reference signal to the first device.

In some example embodiments, the selected channel estimation model has been trained with a set of training received reference signals generated based on a second number of predetermined beams of the first device, and the first number is equal to the second number.

In some example embodiments, the communication channel is a multiple-input multiple-output communication channel; and/or a first number of radio frequency chains is lower than a second number of antenna ports in the first device.

In some example embodiments, the reference signal is a sounding reference signal; and/or the first device is a network device, and the second device is a terminal device.

In some example embodiments, the apparatus further comprises means for performing other steps in some example embodiments of the method 1200. In some example embodiments, the means comprises at least one processor; and at least one memory including computer program code, the at least one memory and computer program code configured to, with the at least one processor, cause the performance of the apparatus.

Figure 13:
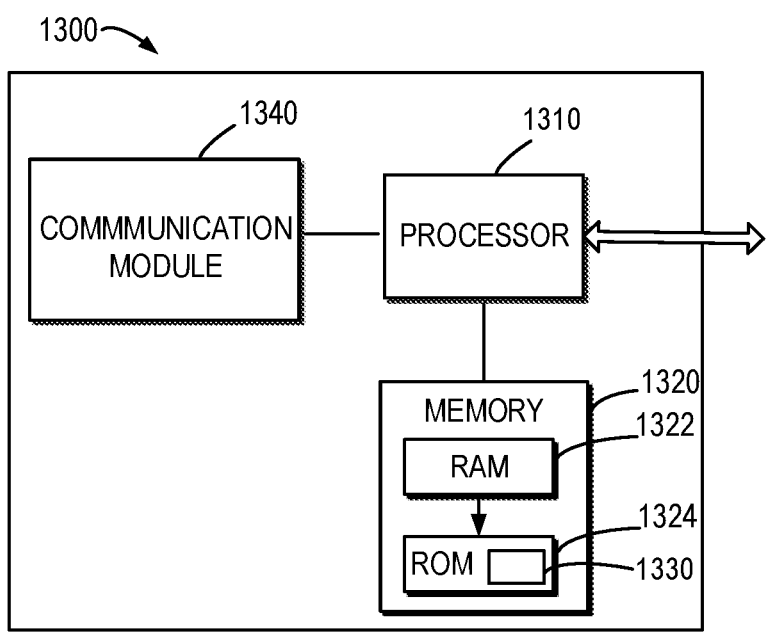
FIG. 13 illustrates a simplified block diagram of an apparatus that is suitable for implementing example embodiments of the present disclosure.

FIG. 13 is a simplified block diagram of a device 1300 that is suitable for implementing example embodiments of the present disclosure. The device 1300 may be provided to implement the communication device, for example the first device 110 or the second device 120 as shown in FIG. 1 or the computing device 900 as shown in FIG. 9. As shown, the device 1300 includes one or more processors 1310, one or more memories 1320 coupled to the processor 1310, and one or more communication modules 1340 coupled to the processor 1310.

The communication module 1340 is for bidirectional communications. The communication module 1340 has at least one antenna to facilitate communication. The communication interface may represent any interface that is necessary for communication with other network elements.

The processor 1310 may be of any type suitable to the local technical network and may include one or more of the following: general purpose computers, special purpose computers, microprocessors, digital signal processors (DSPs) and processors based on multicore processor architecture, as non-limiting examples. The device 1300 may have multiple processors, such as an application specific integrated circuit chip that is slaved in time to a clock which synchronizes the main processor.

The memory 1320 may include one or more non-volatile memories and one or more volatile memories. Examples of the non-volatile memories include, but are not limited to, a Read Only Memory (ROM) 1324, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1322 and other volatile memories that will not last in the power-down duration.

A computer program 1330 includes computer executable instructions that are executed by the associated processor 1310. The program 1330 may be stored in the ROM 1324. The processor 1310 may perform any suitable actions and processing by loading the program 1330 into the RAM 1322.

The example embodiments of the present disclosure may be implemented by means of the program 1330 so that the device 1300 may perform any process of the disclosure as discussed with reference to FIGS. 2 to 12. The example embodiments of the present disclosure may also be implemented by hardware or by a combination of software and hardware.

Figure 14:
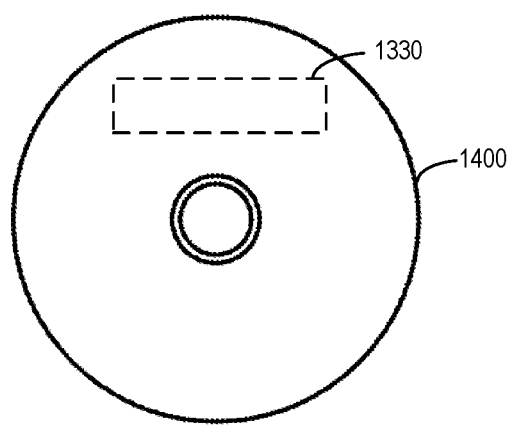
FIG. 14 illustrates a block diagram of an example computer readable medium in accordance with some example embodiments of the present disclosure.

In some example embodiments, the program 1330 may be tangibly contained in a computer readable medium which may be included in the device 1300 (such as in the memory 1320) or other storage devices that are accessible by the device 1300. The device 1300 may load the program 1330 from the computer readable medium to the RAM 1322 for execution. The computer readable medium may include any types of tangible non-volatile storage, such as ROM, EPROM, a flash memory, a hard disk, CD, DVD, and the like. FIG. 14 shows an example of the computer readable medium 1400 in form of CD or DVD. The computer readable medium has the program 1330 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out one or more of the methods as described above with reference to FIGS. 2-12. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
   at least one processor; and
   at least one non-transitory memory storing instructions, that when executed by the at least one processor, cause the first device to:
   determine a signal quality that is expected in transmission of a reference signal from a second device to the first device;
   receive the reference signal from the second device, wherein the reference signal comprises a sounding reference signal;
   select a channel estimation model from a plurality of channel estimation models based on the expected signal quality, the plurality of channel estimation models having been trained for a plurality of candidate signal qualities for the reference signal; and
   determine, using the selected channel estimation model and based on the received reference signal, channel state information of a communication channel from the first device to the second device;
   wherein selecting the channel estimation model is based on
   obtaining a mapping between the plurality of candidate signal qualities and a plurality of signal quality ranges associated with the plurality of channel estimation models, performance metrics of the plurality of channel estimation models in determining channel state information with respect to the plurality of signal quality ranges satisfying a performance threshold;
   determining, based on the mapping, one of the plurality of signal quality ranges into which the expected signal quality falls; and
   selecting the channel estimation model that is associated with the plurality of signal quality ranges.

2. The device of claim 1, wherein the at least one non-transitory memory is storing instructions executed by the at least one processor, to cause the first device to determine the expected signal quality with:
   receiving a null signal from the second device;
   determining at least one of a power of noise or interference in the transmission based on a received power of the null signal; and
   determining the expected signal quality based on at least one of the power of noise or interference and a transmitted power of the reference signal, the transmitted power of the reference signal being indicated by the second device.

3. The device of claim 2, wherein the at least one non-transitory memory is storing instructions executed by the at least one processor, to cause the first device to determine the expected signal quality with:
   determining a transmitted signal-to-noise ratio of the reference signal based on at least one of a ratio of the transmitted power of the reference signal to the power of noise or interference.

4. The device of claim 1, wherein the at least one non-transitory memory is storing instructions executed by the at least one processor, to cause the first device to receive the first number of transmissions of the reference signal with:
   receiving the first number of transmissions of the reference signal with a second number of predetermined beams of the first device, respectively, the second number being equal to the first number.

5. The device of claim 4, wherein the at least one non-transitory memory is storing instructions executed by the at least one processor, to cause the first device to select the channel estimation model with:
   selecting, from the plurality of channel estimation models, the channel estimation model that has been trained with a set of training received reference signals generated based on the second number of predetermined beams.

6. The device of claim 4, wherein the second number of predetermined beams comprises one or two predetermined beams of the first device.

7. The device of claim 1, wherein the at least one non-transitory memory is storing instructions executed by the at least one processor, to cause the first device to:
   receive the reference signal based on:
      determining a first number of transmissions of the reference signal, the first number being equal to or larger than one;
      transmitting an indication of the first number to the second device; and
      receiving the first number of transmissions of the reference signal from the second device.

8. The device of claim 1, wherein the at least one non-transitory memory is storing instructions executed by the at least one processor, to cause the first device to determine, for a given channel estimation model of the plurality of channel estimation models, the associated signal quality range with:
   obtaining a plurality of test received reference signals, the plurality of test received reference signals generated based on a plurality of test signal qualities;
   applying the given channel estimation model to determine test channel state information based on the plurality of test received reference signals;
   determining a plurality of performance metrics of the given channel estimation model for the plurality of test signal qualities based on the test channel state information and ground-truth channel state information;
   selecting a test signal quality from the plurality of test signal qualities with comparing the performance metrics with the performance threshold; and
   determining the associated signal quality range based on the selected test signal quality and the candidate signal quality for which the given channel estimation model has been trained.

9. The device of claim 1, wherein the at least one non-transitory memory is storing instructions executed by the at least one processor, to further cause the first device to:
   determine a beamforming configuration for transmission from the first device to the second device based on the channel estimation information; and
   transmit data over the communication channel from the first device to the second device based on the beamforming configuration.

10. A method comprising:
   determining a signal quality that is expected in transmission of a reference signal from a second device to a first device;
   receiving the reference signal from the second device, wherein the reference signal comprises a sounding reference signal;
   selecting a channel estimation model from a plurality of channel estimation models based on the expected signal quality, the plurality of channel estimation models having been trained for a plurality of candidate signal qualities for the reference signal; and
   determining, using the selected channel estimation model and based on the received reference signal, channel state information of a communication channel from the first device to the second device;
   wherein selecting the channel estimation model is based on
   obtaining a mapping between the plurality of candidate signal qualities and a plurality of signal quality ranges associated with the plurality of channel estimation models, performance metrics of the plurality of channel estimation models in determining channel state information with respect to the plurality of signal quality ranges satisfying a performance threshold;
   determining, based on the mapping, one of the plurality of signal quality ranges into which the expected signal quality falls; and
   selecting the channel estimation model that is associated with the plurality of signal quality ranges.

11. A non-transitory program storage device readable by a machine, tangibly embodying a program of instructions executable by the machine for performing operations, the operations comprising the method as claimed in claim 10.

* * * * *